United States Patent [19]

Kageyama et al.

[11] Patent Number: 4,703,178

[45] Date of Patent: Oct. 27, 1987

[54] NOISE ERASING APPARATUS FOR STIMULABLE PHOSPHOR SHEET

[75] Inventors: Hiroshi Kageyama, Utsunimiya; Katsuhide Koyama, Tokyo; Shigemi Fujiwara, Ohtawara, all of Japan

[73] Assignee: Kabushiki Kaisha Toshiba, Kawasaki, Japan

[21] Appl. No.: 4,272

[22] Filed: Jan. 6, 1987

Related U.S. Application Data

[63] Continuation of Ser. No. 725,114, Apr. 19, 1985, abandoned.

[30] Foreign Application Priority Data

Apr. 19, 1984 [JP] Japan .................................. 59-79979

[51] Int. Cl.[4] .................................................. G01T 1/11

[52] U.S. Cl. ................................ 250/327.2; 250/484.1

[58] Field of Search .......................... 250/327.2, 484.1; 323/239, 246; 315/158, 149

[56] References Cited

U.S. PATENT DOCUMENTS 4,271,387 1/1981 Mukai et al. ........................ 323/246
4,438,333 3/1984 Teraoka et al. .

FOREIGN PATENT DOCUMENTS 938667 12/1978 Canada ................................ 323/239
0067686 12/1982 European Pat. Off. ............ 323/239

*Primary Examiner*—Carolyn E. Fields
*Assistant Examiner*—Richard Hanig
*Attorney, Agent, or Firm*—Oblon, Fisher, Spivak, McClelland & Maier

[57] ABSTRACT

An apparatus for erasing fog in the form of environmentally induced radiation energy stored in a stimulable phosphor sheet used for radiation image recording and reproducing, wherein a radiation image is once recorded in the stimulable phosphor sheet and then read out and reproduced on a recording material. The apparatus includes a power supply to a lamp for emitting erasing light, and a power controller connected between the power source and the lamp for maintaining at a predetermined constant value the power supplied to the lamp, thereby to keep constant the luminance and color temperature of the lamp.

4 Claims, 2 Drawing Figures

NOISE ERASING APPARATUS FOR STIMULABLE PHOSPHOR SHEET

This application is a continuation of application Ser. No. 725,114, filed Apr. 19, 1985, now abandoned.

BACKGROUND OF THE INVENTION

1. Field of the Invention

The present invention relates generally to a noise erasing apparatus for a stimulable phosphor sheet, and more particularly to an improved power supply for supplying power to a light source for emitting light to conduct a second erasing for stimulable phosphor shot.

2. Discussion of Background

As is well known in the art, a photographic method using a silver salt, such as radiography, in which an X-ray film having an emulsion layer including a silver salt is used in combination with an intensifying screen has generally been employed to obtain a radiation image. Recently, due to various problems, such as a shortage of silver resources, a method of obtaining a radiation image without using a silver salt has been desired.

One radiation image recording technique is disclosed in U.S. Pat. No. 3,859,527, entitled, APPARATUS AND METHOD FOR PRODUCING IMAGES CORRESPONDING TO PATTERNS OF HIGH ENERGY RADIATION, issued to Lucky. This patent discloses a method of radiation image recording which employs a radiation image storage panel including a stimulable phosphor which emits light when stimulated by an electromagnetic wave selected from visible light and infrared rays after exposure to radiation such as X-rays, α-rays, β-rays, high energy neutrons, electron beams, vacuum ultra-violet rays, ultra-violet rays and other similar electromagnetic waves or corpuscular beams.

Radiation image systems successfully using the stimulable phosphor in radiography are described in detail in U.S. Pat. No. 4,236,078, entitled, METHOD AND APPARATUS FOR RECORDING AND REPRODUCING A RADIATION IMAGE, issued to Kotera, et al.

In the radiation image recording and reproducing method described above, the final visible image may be reproduced in the form of a hard copy or may be displayed on a cathode ray tube. The stimulable phosphor sheet used in this method may take various forms such as panel, drum, or the like, which are herein generally referred to as imaging plates (IP). For economical reasons of economy, it is desirable that the IP be used repeatedly in many separate radiographic operations, such as 1,000 operations.

Two problems have been posed in reusing the stimulable phosphor sheet in the course of the radiation image recording and reproducing systems and processes as described above.

One problem has been that a part of the previously stored radiation image remains in the stimulable phosphor sheet after use and disadvantageously causes noise to occur in the visible image reproduced from the stimulable phosphor sheet when it is reused. Theoretically, the radiation energy of the radiation image stored in the stimulable phosphor sheet should disappear when the sheet is scanned with a stimulating ray of a sufficient intensity to release sequentially the radiation energy stored as light emission. However, in actuality, the stored radiation energy cannot be completely eliminated only by the scanning of the stimulating ray. Therefore, a first erasing in which the radiation image previously stored in the stimulable phosphor is to be erased at high illumination for a long length of time by use of a large-scale device can be carried out before the stimulable phosphor sheet is fed in performing radiography.

Another problem has been that a stimulable phosphor contains a trace of radioactive isotopes such as $^{226}Ra$ and $^{40}K$, which emit radiation and cause the stimulable phosphor sheet to store the emitted radiation energy even when the sheet is not being used in radiography. These traces of radioactive isotopes also constitute a cause of the noise developed in the reproduced visible radiation image. Further, a stimulable phosphor sheet is also affected by environmental radiations such as cosmic rays and X-rays emitted from other X-ray sources and also stores the such energy. These types of radiation energy also cause noise to appear in the visible radiation image reproduced therefrom. In order to erase the effects of such obstructive radiation energy, a second erasing can be conducted in a short length of time immediately before the next radiography operation by a small-scale erasing device positioned in the radiographic systems. A device and method of this kind is known from U.S. Pat. Nos. 4,438,333, entitled NOISE ERASING APPARATUS FOR STIMULABLE PHOSPHOR SHEET, issued to Teraoka et al, and 4,439,682, entitled NOISE ERASING METHOD IN A RADIATION IMAGE RECORDING AND REPRODUCING METHOD, issued to Matsumoto et al.

An optimized second erasing device, i.e., an illuminant must meet at least the following three requirements:

1. It must have an appropriate illumination of light from light source to complete the erasing operation quickly.

2. It must not emit ultra-violet rays which constitute a cause of noise developed during the second erasing operation.

3. It must not increase the temperature due to exposure by light in order to protect the supporting plate for guiding and supporting and guiding the stimulable phosphor sheet.

The illuminant may for example be a tungsten-filament, fluorescent, sodium, xenon or iodine lamp, or the like.

Regarding the above illuminant, it is well known that the illuminance depends on the luminance of the lamp used in such a device, and the cause of noise as described previously and temperature radiation increases with decreasing of the color temperature in the illuminant. Further, the luminance of lamp and the color temperature of the lamp are determined in accordance with the load power to the lamp.

To maintain a substantially constant load power of the lamp is required so as to regulate the luminance and color temperature of the lamp in accordance with the above requirements, it being understood that in the present application, the load is a lamp. The load power ($P_l$) is given as follows:

$$P_l \text{ (Load power)} = E_l \text{ (Input voltage supplied to the filament in the lamp)} \times I_l \text{ (Filament current).}$$

In the prior art, regulation of the input power applied to the lamp in the erasing device is performed by detecting the line voltage in the line connected between the lamp and the power regulator which regulates the input power applied to the lamp instead of the actual input voltage. However, the line voltage is different from the actual input voltage due to cable resistance in the line, therefore, which makes it difficult to regulate the input power supplied to the lamp with accuracy.

SUMMARY OF INVENTION

Accordingly, an object of the present invention is to provide an improved noise erasing apparatus for a stimulable phosphor sheet in which the input power supplied to a lamp of the apparatus is maintained substantially constant without regard to changes in source voltage.

It is another object of the present invention to provide an power supply used for a second noise erasing apparatus for a stimulable phosphor sheet, in which the input power supplied to the lamp is easily, and accurately regulated.

A further object of this invention is to provide an improved noise erasing apparatus wherein the above-mentioned types of radiation energy undesirably stored in the stimulable phosphor sheet can be erased over a wide-range of radiation wavelengths so that diagnosis using the erased stimulable phosphor sheet is unaffected.

Yet another object of the present invention is to provide an improved noise erasing apparatus including a second erasing apparatus emitting and exposing the stimulable phosphor sheet to light having constant luminance and color temperature.

These and other objects are achieved according to the invention by providing a novel noise erasing apparatus for erasing stored radiation energy causing noise in the resultant visible radiation image reproduced from a stimulable phosphor sheet used in radiography, including a source of alternating current, an illuminant connected to the source via a power line for emitting noise erasing light, a current detector connected to the line for detecting electric current passing through the line and for calculating an effective value of the current in the line, and a power controller connected between the source and the illuminant for maintaining at a predetermined constant value the load power supplied to the illuminant by said source based on the effective value of current calculated by the current detector.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Figure 1:
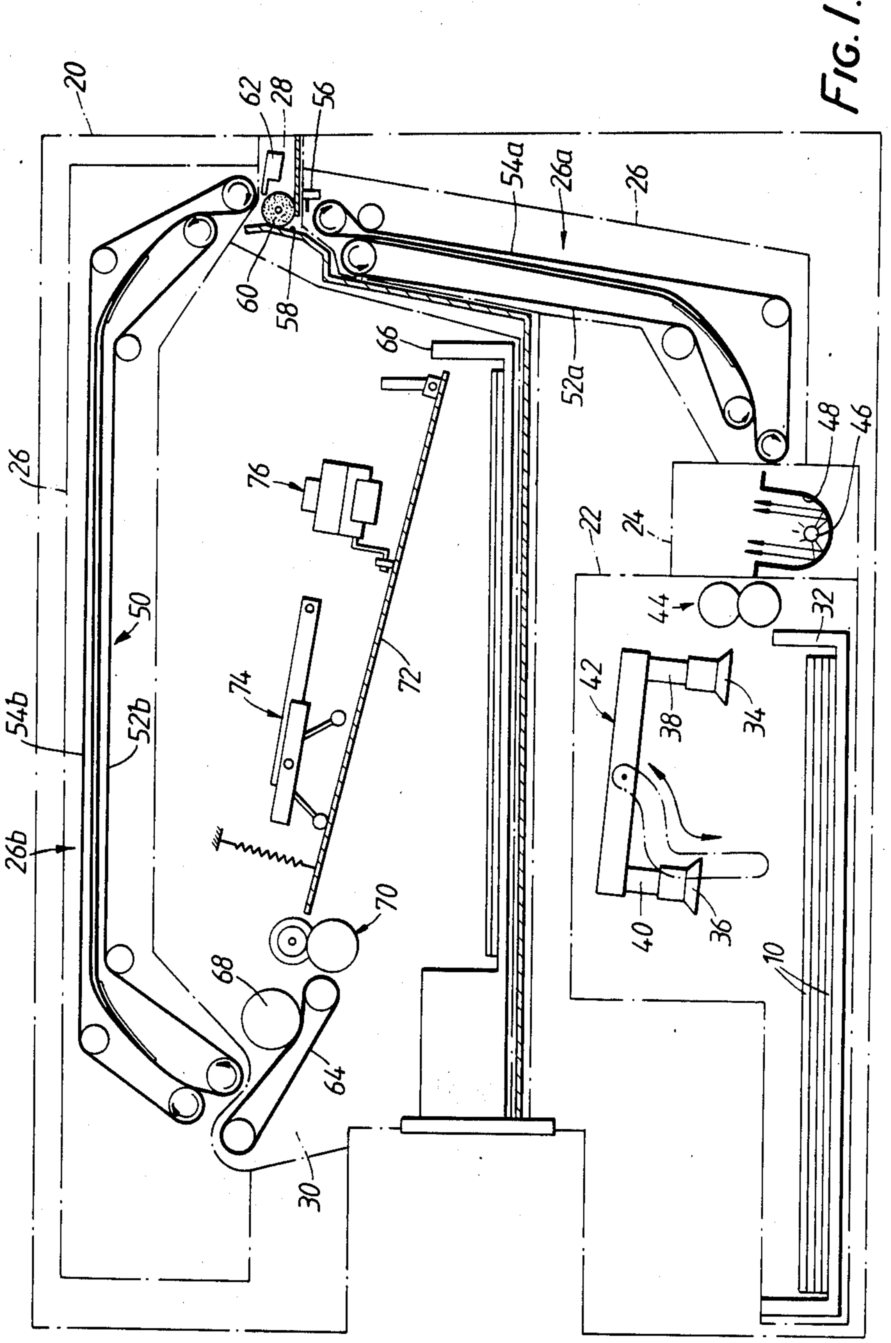
FIG. 1 is a diagrammatic perspective view of an X-ray diagnostic system using stimulable phosphor sheets having a second erasing apparatus according to the invention; and, FIG. 2 is a simplified schematic diagram, largely in block form, of the second erasing apparatus according to the invention using an improved power supply.

Referring now to the drawings, wherein like reference numerals designate identical or corresponding parts, and particularly to FIG. 1 thereof, an X-ray diagnostic system 20 is shown having a taking-up and feeding device 22 for unexposed stimulable phosphor sheets 10, a second noise erasing apparatus 24, a transport system 26, a light-tight portion 28, and a receiving device 30 for exposed stimulable phosphor sheets 10 transported by the transport system 26.

The taking-up and feeding device 22 includes a supply magazine 32 to be removed from the taking-up and feeding device 22 (hereinafter referred to as a feed device) to enable convenient loading of unexposed stimulable phosphor sheets 10 (hereinafter referred to as IP) in a darkroom, a taking-up mechanism 42 including take-up arms 34, 36 for taking up the IPs one by one from the supply magazine 32 by suction of vacuum pumps 38, 40, and carrying rollers 44 for forwarding an unexposed IP 10 to the transport channel of the transport system 26. The IPs are taken-up one at a time by the take-up arms 34, 36 by suction on the side of the IP opposite to the fluorescent layer side of IP 10. The taken-up sheet 10 is moved to the transport system 26 by the carrying rollers 44.

The second noise erasing apparatus 24 (hereinafter referred to as the erasing apparatus) includes a lamp 46, for example, a tungsten-filament, fluorescent, sodium, xenon or iodine lamp, and a reflector 48 disposed as shown in FIG. 1, whereby IP 10 is exposed uniformly over a wide surface area. Thereby, the efficiency of exposure to light of the lamp 46 for IP 10 is increased. The erasing apparatus 24 is synchronized with the movement of the IP 10 so that it emits light when the forward end of the taken-up IP 10 reaches the carrying rollers 44, and is supplied with power from a power supply which will be described in greater detail hereinafter. The IP 10 is exposed to light when it is passed over the erasing apparatus 24 at a predetermined speed by the carrying rollers 44.

A transport system 26 is provided in the X-ray diagnostic 20. During an operating cycle, the transport system 26 concurrently transports an unexposed IP 10 from the supply magazine 32 to a preexposure station 50 in part defined by the X-ray tube and transports an exposed IP 10 from the preexposure station 50 to the receiving device 30. The transport system 26 has two continuous band portions **26*a*, 26*b*. One portion 26*a* is occupied in transporting the IP 10 from the carrying roller 22 to the light-tight portion 28. The other band portion 26*b* is occupied in transporting the IP 10 from the light-tight portion 28 through the preexposure station 50 to the receiving device 30. Each portion 26*a*, 26*b* includes a pair of continuous band loops (52*a*, 54*a*) and (52*b*, 54*b*), which runs around roller wheels in a path. The IP 10 is transported in the transport channel defined by these band loops (52*a*, 54*a*) and (52*b*, 54*b*) while being held between two facing band loops (52*a*, 54*a*) or (52*b*, 54*b*). The IP 10 is transported by the transport system 26 and stopped at the position where the IP contacts the position detector 56 disposed in the forward end thereof. The IP 10 stays at this staying position during a predetermined period without being transported to the second portion 26*b* of the transport system 26**.

In the light-tight portion 28, there is provided a guide plate 58 for the IP 10, a light-sealed roller 60 for forwarding the IP with the guide plate 58, and a defect detector 62 for detecting a defect on the surface of IP 10 by suitable means. These components are arranged to prevent light from entering into the darkroom.

The second portion **26*b* of the transport system 26 includes a top band loop 54*b*** and a bottom band loop 52*b* which can be moved in a direction perpendicular to the path of an X-ray beam, and into an exposure position where the X-ray beam from a source (not shown) passes through a patient positioned adjacent thereto. Movement of the IP 10 into the exposure position is carried out after the IP 10 is advanced in the precise position on the band loops 52*b*, 54*b*, for example, a central portion of the second transport portion 26*b*. If a defective IP 10 is detected by the defect detector 62, it will be transported directly to the receiving device 30 without being moved into the exposure position.

The receiving device 30 as depicted in FIG. 1 includes a timing belt 64 riding in timing belt pulleys for depositing the exposed IP 10 into the receiving magazine 66. While being deposited into the magazine 66, gripped by a combination of a drive roll 60, and a pair of ejector rolls 70 for feeding the exposed IP 10 into the receiving magazine 66. The receiving magazine 66 receives the exposed IP 10, mounted on tracks (not shown) to facilitate their removal to a darkroom for loading and unloading. A spring-biased press pad 72 is arranged downstream in the feeding path behind the ejector rolls 70. This press pad 72 is pivotable about a pivot axis and a spring urges the pad perpendicular to the direction of IP feeding. Pad 72 is flapped by suitable driving mechanism 74 to load the exposed IPs 10 uniformly in the receiving magazine 66. Finally, receiving device 30 includes a bar-code reader 76 for reading the identification of IP 10 and providing electrical signals corresponding thereto. Of course, the magazine 66 is a light-tight enclosure.

Figure 2:
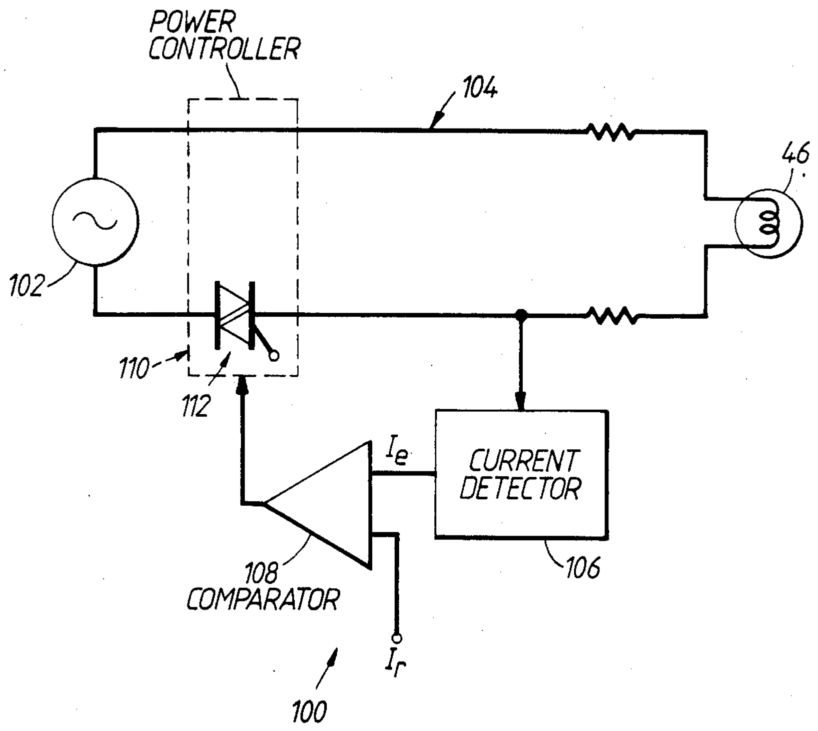

Now referring to FIG. 2, a schematic of a power supply 100 for the lamp of the erasing apparatus 24 shown in FIG. 1 is seen. The lamp 46 is connected to the AC power source 102 through a power line 104. A current detector 106 is connected to the power line 104, and detects the lamp current i(t). Detector 106 calculates the effective value $I_e$ of the current i(t), with $I_e$ corresponding to the actual detected current. The detector 106 is connected to one of the input terminals of a comparator 108, to which is also provided the reference value $I_r$ through the other input terminal thereof. A power controller 110 is connected to the output terminal of the comparator 108, which conducts phase-controlling of the current i(t) passing through the power line 104 in accordance with the output of the comparator 108 as the AC power supplied to the lamp 46 by the source 102 is maintained at a constant value.

The effective value Ie may be calculated in the detector 106 from the detected current i(t) as follows:

$$I_e = \frac{1}{T} \int_0^T i^2(t)dt \tag{1}$$

Where T is the period of the alternating current.

The comparator 108 determines the difference $I_d$ between the reference $I_r$ and the effective value $I_e$ of the detected current i(t) and applies a corresponding signal to the power controller 110. The reference value $I_r$ is determined relative to the constant value of the load power in the lamp to be maintained.

As is evident from the above description, control of the load power is obtained by means of a single sensor, current detector 102, and thus eliminates any need for a voltage sensor for sensing the lamp voltage directly. As discovered by applicants, a voltage reading from such a voltage sensor would not provide a sufficiently accurate reading because of variations in potential drops across the connectors to the lamp electrodes. Thus, the present invention advantageously eliminates the need for a voltage sensor while improving the accuracy of voltage regulation to the load.

As shown in FIG. 2 the power controller 110 is of the phased controlled type suitable to be interposed between the AC power source 102 and the lamp 46. Controller 110 includes a triac 112 connected to the power line 104. A bias circuit (not shown) provides a rectified sample which is applied to the gate of triac 112. Based on the comparison result of the comparator, current conduction by triac 112 is varied to vary the interval of the rectified sample signal for phase-controlling the current i(t) through the power line 104. Thereby, the load power of the lamp 46 is maintained at a constant value within very close limits during a controlling period.

As described previously, an alternating current power source is used in the erasing apparatus as a power source.

Generally, the lamp 46 has a resistance which is varied with variations of the filament temperature. Then, the resistant $R_l$ has a great effect on the lamp current $I_e$. If it is assumed that the variation of the lamp resistance $R_l$ in accordance with the variation of the filament temperature is negligible during the operation with regulated power supplies, the load power $P_l$ designated by the lamp 46 is represented by the following equation:

$$P_l = E_l X I_l = (I_l \times R_l) X I_l = I_l^2 X R_l \tag{2}$$

where $E_l$ is the lamp voltage.

As understood from the above equation (2), it is possible to keep the lamp load power $P_l$ constant by controlling the lamp current $I_l$, thereby to maintain the luminance and color temperature of the lamp 46 at a constant value to satisfy the requirements for the erasing apparatus. It should be understood that the spectrum of the erasing radiation from the lamp varies as a function of the lamp power $P_l$. Therefore, if $P_l$ is not carefully controlled, radiation outside the erasing spectrum might be produced by the lamp, which would have the effect of producing noise stored in the IP 10, instead of erasing noise.

In addition, if it is assumed that the calorific value of the direct current is equal to that of the alternating current, the following equation is determined from (1) and (20):

$$\int_0^T R_l i^2(t)dt = R_l \cdot I_l^2 \cdot T \tag{3}$$

where T is the period of the alternating current.

Equation (3) indicates that keeping the lamp current $I_l$ constant corresponds to regulating the effective value of the alternating current $$Ie\left(= \frac{1}{T} \int_0^T i^2(t)dt\right).$$

In the power controller 110 the operation for maintaining the load power constant is performed by using the effective value $I_e$, operationally $$I_c^2, \text{ where } I_c^2 = \frac{1}{T}\int_0^T i^2(t)dt \qquad (4)$$

Therefore, the load power in the lamp 46 is kept at a constant value despite changes in the source voltage.

Although the invention has been described in its preferred form with a certain degree of particularity, it is understood that the present disclosure has been made only by way of example. For example, the embodiment utilizes a power controller of the phased-controlled type. However it is possible to utilize suitable current control means to maintain the effective current constant by varying the voltage. Further, the controller 110 is not limited to use of triacs and equivalent components instead of triacs can be used.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A noise erasing apparatus for erasing stored radiation energy causing noise in a resultant visible radiation image reproduced from a stimulable phosphor sheet used in radiography, comprising:

a source of alternating current;

irradiation means for emitting noise erasing light at a predetermined illumination and color temperature, said irradiation means connected to said source via a power line;

current detector means connected to said line for detecting electric current passing through said irradiation means and for calculating an effective value of said current based on said detected current;

comparator means for generating a control signal based on a comparison of said effective value of current calculated by said current detector means and a predetermined constant value; and power controller means connected between said source and said irradiation means for maintaining at a predetermined constant value load power supplied to said irradiation means responsive to the control signal generated by said comparator means so that noise erasing light of said predetermined illumination and color temperature is emitted from said irradiation means.

2. An apparatus according to claim 1, wherein said power controller means is of the phased control type.

3. An apparatus according to claim 2, wherein said power controller means comprises:

triac means for varying the period of a rectified sample being supplied to the gate of at least one triac.

4. An apparatus according to claim 1, wherein said irradiation means is a lamp positioned downstream in a transport means for transporting said stimulable phosphor sheet behind a supply magazine for stacking a plurality of stimulable phosphor sheets therein.

* * * * *